(12) United States Patent
Villatel et al.

(10) Patent No.: US 12,395,350 B2
(45) Date of Patent: Aug. 19, 2025

(54) SIGNATURE VERIFICATIONS USING MERKLE SIGNATURE SCHEMES

(71) Applicant: Hewlett-Packard Development Company, L.P., Spring, TX (US)

(72) Inventors: Maugan Cedric Villatel, Bristol (GB); Thalia May Laing, Bristol (GB); Ilja Siros, Grenoble (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 349 days.

(21) Appl. No.: 17/932,013

(22) Filed: Sep. 14, 2022

(65) Prior Publication Data
US 2023/0299972 A1    Sep. 21, 2023

(30) Foreign Application Priority Data
Mar. 15, 2022  (EP) ..................... 22315063

(51) Int. Cl.
*H04L 9/32*      (2006.01)
(52) U.S. Cl.
CPC .......... *H04L 9/3247* (2013.01); *H04L 9/3239* (2013.01)
(58) Field of Classification Search
None
See application file for complete search history.

(56) References Cited

U.S. PATENT DOCUMENTS

| | | | |
|---|---|---|---|
| 2017/0093579 A1 | 3/2017 | Maximov et al. | |
| 2018/0091309 A1 | 3/2018 | Misoczki et al. | |
| 2019/0319797 A1 | 10/2019 | Suresh et al. | |
| 2019/0319800 A1 | 10/2019 | Misoczki et al. | |
| 2019/0319802 A1 | 10/2019 | Misoczki et al. | |
| 2019/0319803 A1 | 10/2019 | Misoczki et al. | |
| 2020/0220735 A1* | 7/2020 | Praus | H04L 9/0643 |
| 2021/0067321 A1* | 3/2021 | Lu | G06F 16/9027 |
| 2022/0376923 A1* | 11/2022 | Esiner | H04L 9/3239 |

FOREIGN PATENT DOCUMENTS

EP     3506144 A1 *  7/2019

OTHER PUBLICATIONS

Berbecaru, D., et al., "On the Performance and Use of a Space-Efficient Merkle Tree Traversal Algorithm in Real-Time Applications for Wireless and Sensor Networks,", IEEE International Conference on Wireless and Mobile Computing Networking and Communications, 2008, pp. 234-240.

* cited by examiner

*Primary Examiner* — Jeffrey C Pwu
*Assistant Examiner* — Mayasa A. Shaawat
(74) *Attorney, Agent, or Firm* — Quarles & Brady LLP

(57) ABSTRACT

Examples relate to machine readable storage storing instructions arranged, when processed, to realise methods of verifying as valid a received signature, associated with a respective received message, generated using a Merkle Signature Scheme comprising a Merkle Tree, the Merkel Tree comprising a root node, a number of leaf nodes and a number of intermediate nodes disposed between the root node and the leaf nodes; the instructions comprising instructions to:
 calculate a hash value in response to receiving the respective message;
 determine that the calculated hash value corresponds to a stored previously verified hash value
 calculated in response to a previously received message, and
 verify the received signature as valid based on the stored previously verified hash value.

15 Claims, 5 Drawing Sheets

SIGNATURE VERIFICATIONS USING MERKLE SIGNATURE SCHEMES

BACKGROUND

A stateful hash-based signature scheme (HBSS) is a quantum secure signature scheme that provides integrity and data origin authentication on a message even if an attacker has a quantum computer. It is a digital signature scheme that uses a public-private key pair in which the key pair can be used to sign only a fixed number of messages where the upper bound is defined prior to key generation and requires the signer to maintain a state. The computational overhead associated with verifying messages under an HBSS can be significant.

BRIEF INTRODUCTION OF THE DRAWINGS

Examples will be described with reference to the accompanying drawings in which

DETAILED DESCRIPTION

HBBSs use Merkle trees in verifying whether or not a received message and signature are valid. That verification uses significant computational resources to determine if a candidate public key derived from a received message and signature is valid by calculating an overall root node hash value from that candidate public key and verifying if the overall root node is the same as the previously received public key corresponding to the root node. Calculating the candidate public key is computationally resource intensive. Furthermore, the number of calculations performed in verifying a candidate public key increases with Merkle tree height. The number of calculations also increases with sub-tree height as well as with the number of subtrees if the HBSS uses a multi-tree Merkle tree. Examples below demonstrate that a significant reduction in the number of computations used to verify a candidate public key can be realised.

Figure 1:
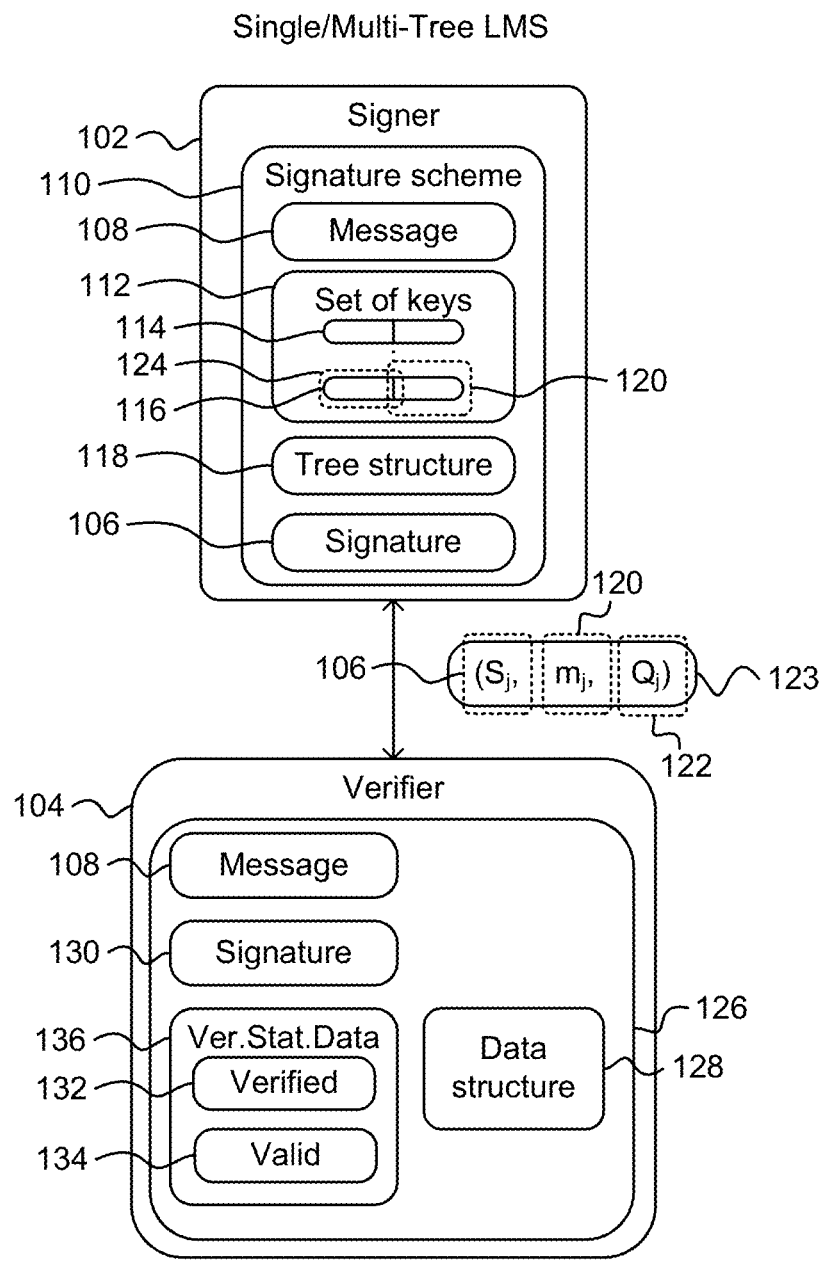
FIG. 1 shows an example cryptographic system comprising a signer and a verifier according to an example.

FIG. 1 illustrates a schematic view of an example cryptographic system 100. The cryptographic system 100 comprises a signer 102 and a verifier 104.

The signer 102 is arranged to generate a signature 106 associated with a respective message 108 using a hash based digital signature scheme 110. The signature 106 is generated using a key selected from a set of one-time-signature (OTS) keys 112. Examples can be realised in which the OTS can be generated from a seed. The seed can be a single seed. The set of keys 112 comprises a plurality of public-private key pairs 114 to 116. The set 112 of keys is associated with a tree structure 118. The tree structure 118 can comprise a multi-tree Merkle tree or a single tree Merkle tree. Such a multi-tree Merkle tree is described below with reference to FIG. 2. Such a single tree Merkle tree is described below with reference to FIG. 3.

The signer 102 is arranged to send the signature 106 to the verifier 104 together with a message 120 and authentication path data 122 as a tuple 123. The signer 102, or other entity, can also send a public key 121 to the verifier 104. Alternatively, the verifier 104 can be arranged to have already received or have stored a set of public keys corresponding to the set of keys 112. The public key 121 corresponds to a private key 124, such as, for example, one of the OTS keys, used to sign the message 108. The authentication path data 122 is associated with hash values within the data structure 118 useful for verifying the signature 106. The authentication path data 120 can represent pairs of hash values and respective nodes within the tree structure or indices associated with respective nodes within the tree structure 116. The hash based digital signature scheme 110 can comprise at least one of: an XMSS: eXtended Merkle Signature Scheme, as established by RFC8391.txt, ISSN: 2070-1721, May 2018, a Leighton-Micali Hash-Based Signatures, as established by RFC8554, ISSN: 2070-1721, April 2019, a Hash-based Signature Schemes as detailed in NIST Special Publication 800-208, October 2020, or any other Merkle hash tree or Hash-Based Signature Scheme, taken jointly and severally in any and all permutations.

Examples will be described in which the signer 102 sends the public keys to the verifier 104. However, examples can be realised in which the verifier 104 has previously received the public keys from the signer 102, or other entity, or in which the verifier 104 was deployed with the public keys having already been embedded within, or otherwise being accessible to, the verifier 104.

The verifier 104 is arranged to verify the received signature 106 using a verification process 126. The verification process 126 is a Merkle tree verification scheme as detailed in the above RFCs. The verification process 126 uses the received tuple 123 comprising the signature 106, the message 121 and the authentication path data 122 to generate a candidate public key 120', in particular, the signature 106 and the message 121 are used to generate the candidate public key that is subsequently verified, if valid, by comparing generated hash values with previous hash values that have been verified as valid. The previous verified hash values 132 can comprise at least one, or more than one, previously calculated or previously received hash value that has been verified by the verifier 104 as valid. The previously calculated or received hash value that has been verified by the verifier 104 as valid can comprise at least one, or more than one, of the set comprising: a hash value associated with a node of a single tree Merkle tree or a node of a multi-tree Merkle tree, an overall root node hash value associated with the overall root node of a multi-tree Merkle tree, a root node hash value associated with a root node of a sub-tree of a multi-tree Merkel tree, a root node hash value associated with the root node of a single tree Merkle tree, or a hash value of a multi-tree single tree Merkle tree, taken jointly and severally in any and all permutations. When the candidate public key 102' has been verified as valid, the corresponding signature 106 can also be deemed to be verified as valid. Furthermore, in response to determining that a hash value is valid, that is, has been verified as valid, at least an indication 134 of at least that validity is stored within a verification status data structure 136.

An example of an implementation of the verification process 126 will be described with reference to FIG. 2.

Figure 2:
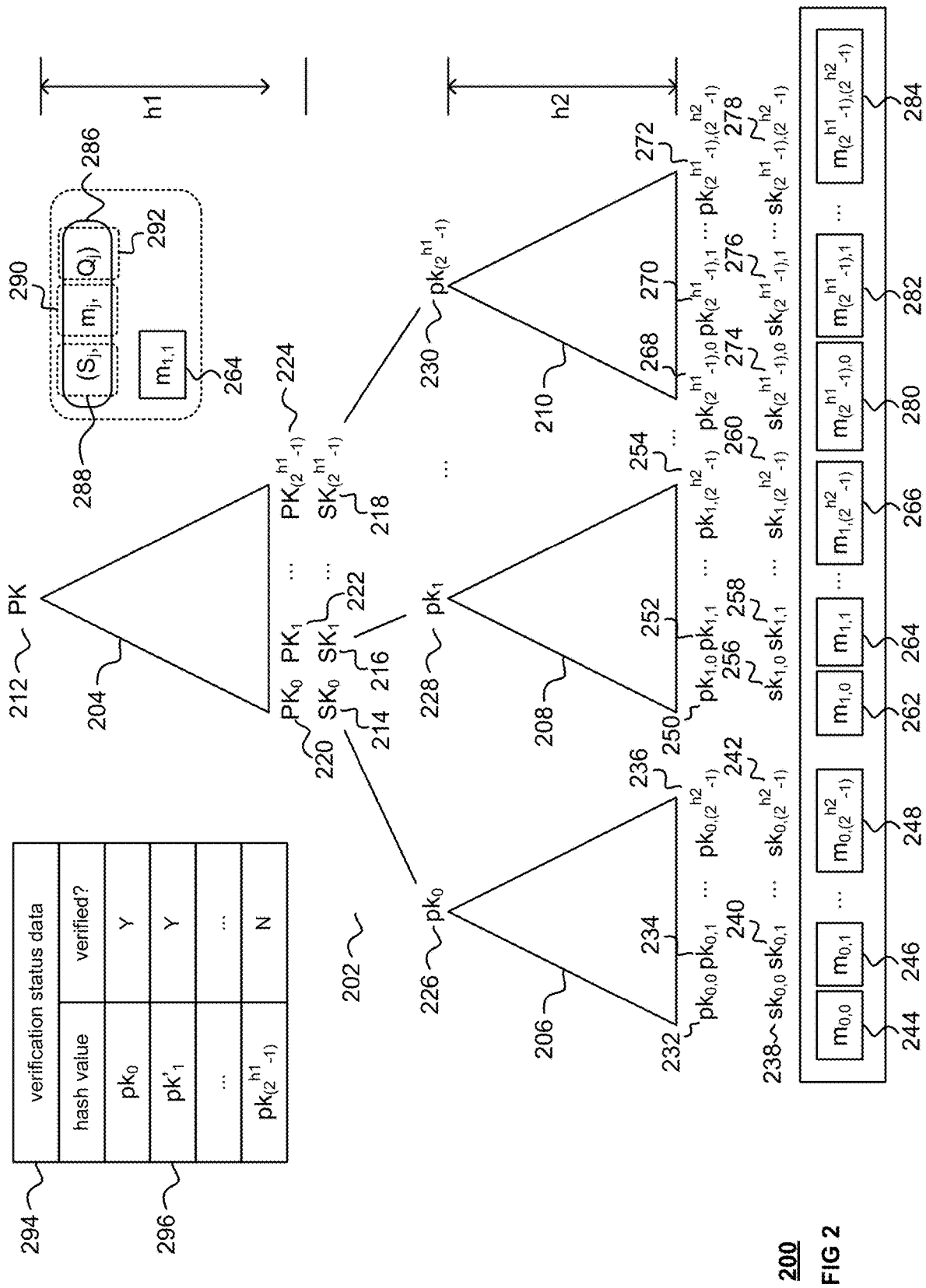
FIG. 2 illustrates a multi-tree Merkle tree and associated verification status data structure to verify a candidate public key according to an example.

FIG. 2 depicts a view 200 of a multi-tree Merkel tree 202. The Merkle tree 202 is an example of the above-described tree structure 118. The Merkel tree 202 comprises a number of sub-trees 204 to 210. Each sub-tree comprises a respective root node, a number of leaf nodes, and a number of intermediate nodes disposed between the root node and the leaf nodes. An intermediate node is an example of an interior node as specified in RFC8554. Each sub-tree has a respective height that is defined as the distance between a root node and the leaf nodes. In the example depicted in FIG. 2, the height of the highest sub-tree 204 is h1 and the height of the lowest level sub-trees 206 to 210 is h2. Examples can be realised in which h1 and h2 have different values or the same value.

The sub-trees 204 to 210 can be binary sub-trees. In general, a Merkle tree-based signature scheme of height h $\in \mathbb{Z}$ which is defined as the distance between the root node and the leaf nodes of the tree, comprises $2^h$ leaf nodes and $2^{h+1}-1$ nodes in total, which, in conjunction with a one-way hash function, H(x,y), extends a one-time signature scheme to $2^h$ signable messages for each public key, that is, for each root node.

Therefore, given the height h1 of the highest sub-tree 204, the highest sub-tree 204 comprises $L=2^{h1}$ leaf nodes and a total of $N=2^{h1+1}-1$ nodes. Similarly, the lowest level sub-trees 206 to 210, given the respective heights h2, comprise $2^{h2}$ leaf nodes and a total of $2^{h2+1}-1$ nodes.

The highest-level sub-tree 204 comprises a root node 212, which is known as the overall root node in a multi-tree Merkle tree. The root node 212 has an associated overall public key, PK. The overall public key, PK, is calculated as a hash of two immediate child nodes (not shown). The highest-level sub-tree 204 also comprises a plurality public keys $PK_0, PK_1, \ldots, PK_{(2^{h1}-1)}$ 220 to 224. Each public key $PK_0, PK_1, \ldots, PK_{(2^{h1}-1)}$ 220 to 224 has a corresponding private key $SK_0, SK_1, \ldots, SK_{(2^{h1}-1)}$ 214 to 218. The private and public keys 214 to 224 are used to sign and verify messages. The messages that are signed by the private keys $SK_0, SK_1, \ldots, SK_{(2^{h1}-1)}$ 214 to 218 are respective public keys $pk_0, pk_1, \ldots, pk_{(2^{h1}-1)}$ 226 to 230 associated with respective root nodes of the sub-trees 206 to 210. Each public key of the public keys $pk_0, pk_1, \ldots, pk_{(2^{h1}-1)}$ 226 to 230 is derived from two associated child hash values (not shown) associated with child nodes (node shown) of the root nodes (not shown).

The lower-level sub-trees 206 to 210 comprise root nodes that have respective root node hash values, respective leaf nodes that have at least one, or both, of respective public keys or hash values of such respective public keys, and respective intermediate nodes that have respective hash values. Each node, other than a leaf node, derives its respective hash value from a pair of child nodes of the intermediate nodes and leaf nodes.

Therefore, the left-most sub-tree 206 depicted in FIG. 2 comprises the above-mentioned public key $pk_0$ 226, a plurality of intermediate nodes, and $2^{h2}$ leaf nodes. The leaf nodes have corresponding public keys $pk_{0,0}, pk_{0,1}, \ldots, pk_{0,(2^{h2}-1)}$ 232 to 236. Each public key of the public keys $pk_{0,0}, pk_{0,1}, \ldots, pk_{0,(2^{h2}-1)}$ 232 to 236 has a corresponding private key $sk_{0,0}, sk_{0,1}, \ldots, sk_{0,(2^{h2}-1)}$ 238 to 242. The public keys $pk_{0,0}, pk_{0,1}, \ldots, pk_{0,(2^{h2}-1)}$ 232 to 236 and private key $sk_{0,0}, sk_{0,1}, \ldots, sk_{0,(2^{h2}-1)}$ 238 to 242 are used to verify and sign respective messages 242 to 248.

It will be appreciated that verification can use more than merely a message, a corresponding signature, and a respective candidate key. The example presented is a simplified example for explanation purposes. However, examples can be realised that use other information as part of the verification. Examples can be realised that also use one or more than one of the following, taken jointly and severally in any and all permutations: a security string that is distinct for each invocation comprising the set of fields {I,r,q,D,l,j,C}, as specified in RFC8554, section 7.1. Similarly, although examples have been described with reference to a signature being generated from a message and the next OTS, examples can also use other information. For example, a Leighton-Micali Hash-based Signature (LMS) can comprise: the number q of the leaf associated with a LM-OTS, a typecode indicating a respective LMS algorithm, an array of h m-byte values associated with a respective authentication path through the tree from the leaf associated with the OTS to the overall root of the tree 202. Furthermore, it will be appreciated that a signature can comprise a number of parameters. The number of parameters can comprise, for example, for an LMS signature, the parameters h: representing the height of the tree, m: representing the number of bytes associated with each node, and H: representing a second-preimage-resistant cryptographic hash function that accepts byte strings of any length and returns an m-byte string, as specified in section 5.1 of RFC8554. Examples can be realised in which such parameters or other information are used consistently throughout the whole tree. However, alternative examples can be realised in which each subtree has a respective set of parameters or other information. The respective sets can be different to one another, be common to one or more than one subset of subtrees with each subset of subtrees having respective common sets of parameters or other information.

The second left-most sub-tree 208 depicted in FIG. 2 comprises the above-mentioned public key $pk_1$ 228, a plurality of intermediate nodes, and $2^{h2}$ leaf nodes. The leaf nodes have corresponding public keys $pk_{1,0}, pk_{1,1}, \ldots, pk_{1,(2^{h2}-1)}$ 250 to 254. Each public key of the public keys $pk_{1,0}, pk_{1,1}, \ldots, pk_{1,(2^{h2}-1)}$ 250 to 254 has a corresponding private key $sk_{1,0}, sk_{1,1}, \ldots, sk_{1,(2^{h2}-1)}$ 256 to 260. The public keys $pk_{1,0}, pk_{1,1}, \ldots, pk_{1,(2^{h2}-1)}$ 250 to 254 and the private key skim, $sk_{1,0}, sk_{1,1}, \ldots, sk_{1,(2^{h2}-1)}$ 256 to 260 are used to verify and sign respective messages 262 to 266.

The above applies to each remaining sub-tree (not shown) culminating in the right-most sub-tree 210. The right-most sub-tree 210 depicted in FIG. 2 comprises the above-mentioned public key $pk_{1,(2^{h1}-1)}$ 230, a plurality of intermediate nodes, and $2^{h2}$ leaf nodes. The leaf nodes have corresponding public keys $pk_{(2^{h1}-1),0}, pk_{(2^{h1}-1),1}, \ldots, pk_{(2^{h1}-1),(2^{h2}-1)}$ 268 to 272. Each public key of the public keys $pk_{(2^{h1}-1),0}, pk_{(2^{h1}-1),1}, \ldots, pk_{(2^{h1}-1),(2^{h2}-1)}$ 268 to 272 has a corresponding private key $sk_{(2^{h1}-1),0}, sk_{(2^{h1}-1),1}, \ldots, sk_{(2^{h1}-1),(2^{h2}-1)}$ 274 to 278. The public keys $pk_{(2^{h1}-1),0}, pk_{(2^{h1}-1),1}, \ldots, pk_{(2^{h1}-1),(2^{h2}-1)}$ 268 to 272 and private key $sk_{(2^{h1}-1),0}, sk_{(2^{h1}-1),1}, \ldots, sk_{(2^{h1}-1),(2^{h2}-1)}$ 274 to 278 are used to verify and sign respective messages 280 to 284.

The messages 224 to 248, 262 to 266 and 280 to 284 can form part of a larger overall message or data set. For example, the messages 224 to 248, 262 to 266 and 280 to 284 can form, or be associated with or otherwise derived from, respective portions of software 286. The software 286 is an example of machine-readable code. Each portion of the software 286 is an example of a portion of data associated with the code.

Although the examples described herein refer to the message or a message, examples can be realised that use or refer to a message representation or the message representation such that a message is input into a signature algorithm that computes a message representation from the message and computes any signatures based on the message representation rather than directly from the message. A verifier in such as arrangement would compute the converse. Accordingly, any of the examples described herein can use such a message representation instead of a message.

Assume that the tree 202 is a two-level tree. Although an example will be described with reference to the tree being a two-level tree, examples can be realised in which the tree 202 has at least two or more levels. The private keys 238 to 242, 256 to 260, 274 to 278 are used to sign respective messages 224 to 248, 262 to 266 and 280 to 284. The public keys are used to populate the tree with respective hash values. Each hash value of a parent node is generated from a pair of hash values; one from each child node of two child nodes in the case of a binary tree. The initial hash values of the leaf nodes are generated from hash values associated with pairs of the public keys 232 to 236, 250 to 254, 268 to 272. The hash values are calculated for each level within each subtree, and for each subtree, until the subtree is fully populated hash values and respective root node hash values 212, 226 to 230. The overall root node hash value 212 is sent to the verifier 104 for using in verifying the messages 244 to 248, 262 to 266, 280 to 284 sent to the verifier in due course.

Assume that the message $m_{1,1}$ 264 is to be sent to the verifier 104. A signature corresponding to the message is generated. In the case of a multi-level Merkle tree, the signature comprises as many One-time-signatures (OTS) as there are levels in the tree. In the present example, the signature comprises two OTS. The two OTS comprise: one OTS on the message $m_{1,1}$ 264 and one OTS on the root node hash value, that is, the public key $pk_1$ 228 of the corresponding sub-tree 208. Although the example has been described with reference to a simple public key, examples can be realised in which the public key comprises the root node hash value together with other parameters such as, for example, one or more than one parameter taken from the set of {l, h, w, q} taken jointly and severally in any and all permutations, where l is a 16-byte string that indicates which Merkle tree with which a OTS is used, h is the height of a Merkle tree, w is the Winternitz parameter, and q is a 32-bit integer that indicates the leaf of the Merkle tree where the OTS public key appears. Examples can be realised in which any of the public keys comprises a hash value together with other parameters. For instance, in respect of a tree or sub-tree, examples can be realised in which the public key comprises a root node hash value together with other parameters such as any parameters of the set {l, h, w, q, n, p, ls, m} taken jointly and severally in any and all permutations; the parameters {l, h, w, q, n, p, ls, m} are defined in RFC8554 in, for example section 4.1, where n is the number of byte of the output of the hash function, w is the width in bits of the Winternitz coefficients, that is, the number of bits from the hash value or checksum that i used with a single Winternitz chains, and it a member of the set {1,2,4,8}, p is the number of n-byte string elements that make up an LM-OTS signature, ls is the number of left-shift bits used in the check sim function Cksm, and H is a second-preimage-resistant cryptographic hash function that accepts byte strings of any length and return an n-byte or m-byte string, l is a 16-byte string that indicates which Merkle tree this LM-OTS is used with, p is a 32-bti integer that indicates the leaf of the Merkle tree where the OTS public key appears, h is the height of the tree, m is the number of bytes associated with each node. Any of the examples can be realised in which the public keys are LMS public keys that comprises one or more than one of the following elements: an LMS parameter set, an LM-OTS parameter set, the random value l and the hash value of the root node, which is defined as K in sections 4.1 and 4.3 of RFC8554, all taken jointly and severally in any and all permutations.

The private key $sk_{1,1}$ 258 is used to sign the message $m_{1,1}$ 264 to generate a OTS on the message $m_{1,1}$ 264, which gives a signature of $Sig_{sk_{1,1}}(m_{1,1})$ The private key $SK_1$ is used to sign the root node hash value $pk_1$ 228 to generate the OTS on the root node hash value $pk_1$ 228, which gives $Sig_{SK_1}(pk_1)$. An overall signature $Sig_{sk_{1,1}}(m_{1,1}), pk_{1,1}, Sig_{SK_1}(pk_1)$, $PK_1$ 286 comprising the OTS 288, the corresponding public keys 290 and associated authentication path data 292 is generated and sent to the verifier 104 as a tuple 288. The tuple 288 is an example of the above-described tuple 123. The authentication path data 292 comprises hash values associated with selected nodes of the multi-tree that are used in verifying the overall signature 286 as valid. The overall signature 286 and corresponding message $m_{1,1}$ 264 are sent to the verifier 104.

The same data structure 202 is constructed at the verifier 104 and used to verify any received signatures, and, in turn, authenticate any received respective messages of the messages 244 to 248, 262 to 266, 280 to 284. For brevity, FIG. 2 will also be used to describe operations at the verifier 104 rather than using an additional separate figure specifically for verifier 104. Therefore, also shown in FIG. 2 is a data structure 294 that is used by the verifier 104 to store an indication of whether or not any hash values have been verified. Examples of hash values that have been verified can comprise, for example, any one or more of: any verified hash values of the subtree root node hash values 226 to 230, any verified hash values of any intermediate node hash values and the overall root node hash value, taken jointly and severally in any and all permutations. Again, as indicated above, although the example has been described with reference to using the overall root node hash value, examples can be realised in which the full public key is used, which comprises the overall root node hash value together with one or more than one parameter. Although the data structure 294 has been depicted separately from the multi-tree Merkle tree 202, examples can be realised in which the information stored within the data structure 294 is stored as part of the multi-tree Merkle tree 202. The data structure 294 is an example of the above-described data structure 136.

An example will be described with reference to FIG. 2 in which sub-tree root node verified hash values are stored in the data structure 294.

The verifier 104 receives the overall signature 286 and corresponding message $m_{1,1}$ 264. The verification process 126 commences traversing the tree 202 calculating hash values from node pairs governed, or otherwise associated with, the authentication path data 292. The traversal is performed bottom-up starting with the leaf node corresponding to a candidate public key $pk_{1,1}$ 252 associated with the first OTS. Each time a hash value is calculated, or for selected hash values (such as those corresponding to root nodes, or some other nodes), a determination is made, from the data structure 294, regarding whether or not the calculated hash value corresponding to a given node has been previously verified as valid. Traversing the tree 202 calculating hash values continues until a calculated hash value is determined from the data structure 294 to have been previously verified as valid. If a calculated hash value is determined to have a corresponding verified hash value stored within the data structure 294, traversing the tree is terminated insofar as concerns the current message $m_{1,1}$ 264 and the signature associated with that message is deemed to be verified as valid, which, in turn, results in the message $m_{1,1}$ 264 being considered to be authentic or authenticated.

It will be appreciated that depending on the message received, the traversal process could continue and culminate in calculating the overall hash value 212 of the overall root node of the upper-most tree 204. However, for signatures associated with private keys associated with the same subtree, the traversal will continue until a previously verified root node of that subtree is encountered within the data structure 294. An initial signature of a subtree generated using an initial private key of that subtree will result in the root node hash value being calculated and being eventually verified as valid.

Therefore, traversing the tree 202 continues until a root node hash value is encountered that has been previously verified as valid. That root node that has been previously verified as valid can be associated with the same subtree associated with a current message such as, for example, message $m_{1,1}$ 264, or can be associated with a subtree of a higher level in the multi-tree Merkle tree 202. Determining that a calculated hash value has been previously verified as valid avoids having to perform verification of OTS signatures or hash value calculations associated with higher nodes, that is, nodes more proximal to the overall root node, which can result in a considerable computational saving compared to calculating all hash values of nodes associated with a leaf node and a respective authentication path culminating the overall root node hash value. Therefore, terminating traversing and calculating such hash values on encountering a previously verified hash value reduces the computational overhead associated with verifying a received signature and, in turn, associated with authenticating a received message. The foregoing also reduces power consumption due to the reduced computational overhead.

Examples will be described with reference to verifying two signatures taken from the second left most subtree 208. The example is highly simplified for the purposes of explanation. The simplified example uses an overall tree comprising an upper subtree 204 with an overall root node and two leaf nodes with no intermediate nodes, and two lower subtree nodes 206, 208; each subtree having a respective root node and two respective leaf nodes with no intermediate nodes. A consequence of such a simplified example is that the authentication paths are similarly simplified. As the heights of the subtrees increase, the authentication paths will become longer due to needing to relate to more nodes, including appropriate intermediate nodes.

Therefore, signing a message $m_{1,0}$ 262 with private key $sk_{1,0}$ 256 gives a signature and message combination of $Sig_{sk_{1,0}}(m_{1,0}),pk_1,Sig_{SK_1}(pk_1)$, and $m_{1,0}$ 262, where:

$Sig_{sk_{1,0}}(m_{1,0})$ is the OTS signature on the message $m_{1,0}$ using the private key $sk_{1,0}$ corresponding to the public key $pk_{1,0}$; and $Sig_{SK_1}(pk_1)$ is the OTS signature on the public key $pk_1$ 228 using private key $SK_1$ corresponding to the public key $PK_1$.

The tuple $Sig_{sk_{1,0}}(m_{1,0}), pk_1, Sig_{SK_1}(pk_1), A_{1,0}=\{pk_{1,1},PK_0\}$ is sent to the verifier, where $A_{1,0}=\{pk_{1,1},PK_0\}$ is the associated authentication path. The message and $m_{1,0}$ 262 is also send to the verifier.

Assuming all hash values are calculated using the same one-way hash function H(key1,key2) and given the tuple $Sig_{sk_{1,0}}(m_{1,0}),pk_1,Sig_{SK_1}(pk_1),A_{1,0}=\{pk_{1,1}, PK_0\}$ and the message $m_{1,0}$ 262, verifying the public key $pk_{1,0}$ comprises performing the following:

1. Receiving $Sig_{sk_{1,0}}(m_{1,0}),pk_1,Sig_{SK_1}(pk_1),A_{1,0}=\{pk_{1,1}, PK_0\}$ and the message $m_{1,0}$ 262, 2. Calculating a candidate public key $pk'_{1,0}$ 250 using the signature $Sig_{sk_{1,0}}(m_{1,0})$ 256 and the message $m_{1,0}$ 262;

3. Verifying the candidate public key $pk'_{1,0}$ 250 is in the tree with root node $pk_1$ using the respective authentication path $A_{1,0}=\{pk_{1,1},PK_0\}$ by:

3.1 calculating $H(pk'_{1,0}=pk'_{1,1})=pk'_1$, where $pk'_1$ is a candidate root node hash value of the root node of the subtree 208;

3.2 If $pk'_1=pk_1$, continuing with:

3.2.1 calculating a further candidate public key $PK'_1$, using the received public key $pk_1$ and the respective signature $Sig_{SK_1}(pk_1)$ on $pk_1$ generated using $SK_1$ 3.2.2 verifying the further candidate public key $PK'_1$ by:

3.2.2.1 calculating $PK'=H(PK_0,PK'_1)$, 3.2.2.2 If $PK'=PK$, concluding that:

the further candidate public key $PK'_1$ has been verified as valid, the candidate public key $pk'_{1,0}$ 250 has been verified as valid, and the candidate root node $pk'_1$ has been verified as valid.

Once the candidate root node $pk'_1=pk_1$ has been verified as valid, that verified hash value is stored as an entry 296 in the data structure 294. The entry can comprise an indication of the verification status associated with the candidate root node $pk'_1$ such as the "Y" indicated, which represents "Yes—verified as value". However, examples can be realised in which the entry does not comprise an indication of the verification status associated with the candidate root node $pk'_1$ such as the "Y" indicated. The stored verified hash value is an example of a previously verified hash value associated with a previously received message. Although the examples described herein stored an indication of verification status, examples are not limited to such arrangements. Examples can be realised in which additional, or alternative, data is also stored. For instance, examples can be realised in which the additional, or alternative, data comprises an associated signature. In the present case, the additional, or alternative, data could comprise the signature $Sig_{SK_1}(pk_1)$ on.

The stored verified hash value $pk'_1$ can be used to verify future candidate public keys associated with the same tree or subtree as follows.

As indicated above, signing a message $m_{1,1}$ 264 with private key $sk_{1,1}$ 258 gives a signature and message combination of $Sig_{sk_{1,1}}(m_{1,1}),pk_1,Sig_{SK_1}(pk_1)$, where:

$Sig_{sk_{1,1}}(m_{1,1})$ is the signature on the message $m_{1,1}$ using the private key $sk_{1,1}$ corresponding to the public key $pk_{1,1}$; and $Sig_{SK_1}(pk_1)$ is the signature on the public key $pk_1$ 228 using private key $SK_1$ corresponding to the public key $PK_1$.

The tuple $Sig_{sk_{1,1}}(m_{1,1}),pk_1,Sig_{SK_1}(pk_1),A_{1,1}=\{pk_{1,0},PK_0\}$ is sent to the verifier 104, where $A_{1,1}=\{pk_{1,0},PK_0\}$ is the associated authentication path.

Assuming, again, that all hash values are calculated using the same one-way hash function H(key1, key2) and given the tuple $Sig_{sk_{1,1}}(m_{1,1}),pk_1,Sig_{SK_1}(pk_1),A_{1,1}=\{pk_{1,0},PK_0\}$, verifying the public key $pk_{1,1}$ comprises performing the following:

1. Receiving $Sig_{sk_{1,1}}(m_{1,1}),pk_1,Sig_{SK_1}(pk_1),A_{1,1}=\{pk_{1,0}, PK_0\}$, 2. Calculating a candidate public key $pk'_{1,1}$ 252 using the signature $Sig_{sk_{1,1}}(m_{1,1})$ and the message $m_{1,1}$ 264;

3. Verifying the candidate public key $pk'_{1,1}$ 252 is in the tree with root node $pk_1$ 228 using the respective authentication path $A_{1,1}=\{pk_{1,0},PK_0\}$ by:

3.1 calculating $H(pk_{1,0},pk'_{1,1})=pk'_1$, where $pk'_1$ is a candidate root node hash value of the root node of the subtree 208;

3.2 accessing the data structure entry 296 corresponding to the calculated candidate root node hash value pk'$_1$ and determining that the candidate root node hash value pk'$_1$ has been previously verified as valid;
3.2.3 If pk'$_1$ has been previously verified as valid, concluding that the candidate public key pk'$_{1,1}$ 252 has been verified as valid.

It will be appreciated that the foregoing avoids, or otherwise saves, having to repeat all computations or processing associated with:
3.2.1 calculating a further candidate public key PK'$_1$, using the received public key pk$_1$ and the respective signature Sig$_{SK_1}$(pk$_1$) on pk$_1$ generated using SK$_1$,
3.2.2 verifying the further candidate public key PK'$_1$ by:
3.2.2.1 calculating PK'=H(PK$_0$, PK'$_1$),
3.2.2.2 If PK'=PK, concluding that:
the further candidate public key PK'$_1$ has been verified as valid,
the candidate public key pk'$_{1,0}$ 250 has been verified as valid, and
the candidate root node pk'$_1$ has been verified as valid.

Therefore, the bottom-up traversal of the tree structure 202 for verifying a public key, or any other values such as, for example, any hash values, can be terminated, insofar as concerns the current message m$_{1,1}$, when a previously verified as valid hash value has been encountered such as the candidate root node pk'$_1$.

When a candidate public key is verified, a message that was signed using the secret key corresponding to the verified candidate public key is deemed to be authentic.

As more messages are sent to the verifier 104, the data structure 294 becomes increasingly populated with values that have been verified. For example, signing messages using respective secret keys that are associated with corresponding public keys that are part of the same, or a common, subtree reduces the overall verification process computational overhead to verifying a candidate public key, or other value, such as a hash value, up to the root node of that same, or common, subtree. Alternatively, or additionally, examples can be realised in which the verification process terminates at some other level or on some other condition such as, for example, a calculated hash value corresponding to a stored previously verified hash value. The calculated hash value or the stored previously verified hash value can be a hash value at any level of a subtree or tree.

Although the examples described herein refer to the data structures becoming increasingly populated, examples are not limited to such arrangements. Any and all examples can be realised in which the data within the data structures is managed or pruned, which can be useful in resource constrained environments. For instance, assuming that pk$_0$ is stored along with the signature Sig$_{SK_0}$(pk$_0$) on pk$_0$, that information will be used to efficiently verify signatures on messages up to 248. Then message m$_{1,0}$ 262 will use pk$_1$ instead of pk$_0$. The verifier 104 can then replace pk$_0$, Sig$_{SK_0}$(pk$_0$) with pk$_1$, Sig$_{SK_1}$(pk$_1$), since pk$_0$ will not be used again.

Although the examples herein have been described with reference to storing the verified hash values, such as the verified root hash values, in the data structures, examples are not limited to such arrangements. Examples can be realised in which respective sets of further data (not shown) are also stored within the data structures. For example, examples can be realised in which the data structures can store at least one or more than one, taken jointly and severally in any and all permutations, of: {a verified public key and a confirmation of verification status such as (pk$_0$, yes), a verified public key and an associated signature on that verified public key such as (pk$_0$,Sig$_{SK_0}$(pk$_0$))}. Examples can be realised in which a data structure has a one-to-one correspondence with an overall root node to accommodate situations in which there are multiple different signers with multiple different public keys, that is, there will be one data structure per overall root node. Therefore, in such circumstances reaching a conclusion that a calculated hash value corresponding to stored previously calculated hash value will be conditional on multiple criteria being met; the criteria being related to the additional data contained within the one or more than one sets of further data.

Figure 3:
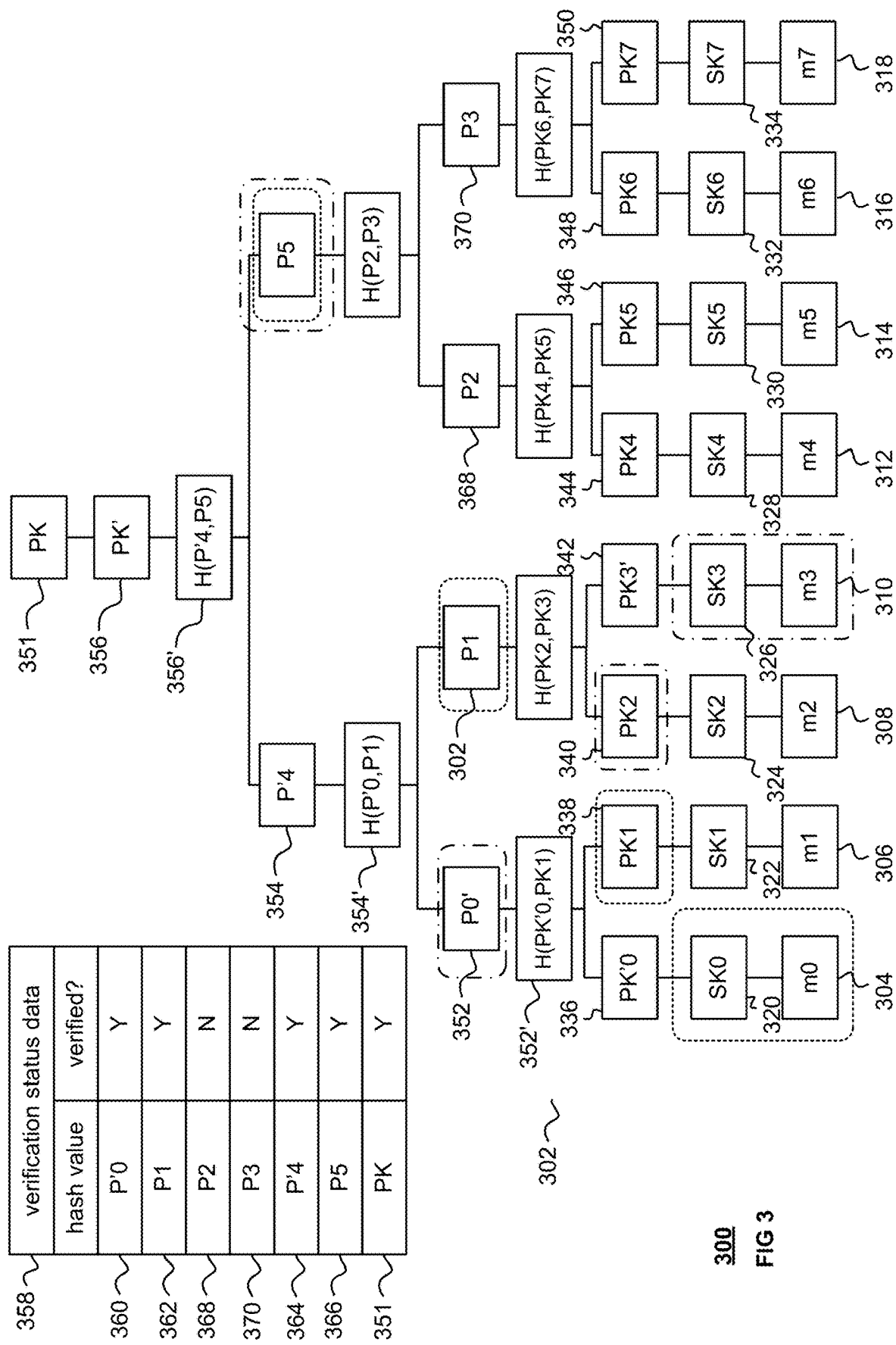
FIG. 3 depicts a single tree Merkel tree and associated verification status data structure to verify a candidate public key according to an example.

Referring to FIG. 3, there is shown a view 300 of a single Merkle tree 302. The Merkle tree 302 can be used to verify or authenticate a plurality of messages 304 to 318 that have been signed using respective private keys 320 to 334. The private keys 320 to 334 form part of a number of private-public key pairs. Each private-public key pair also comprises a respective public key 336 to 350. Additionally, or alternatively, the Merkle tree can be used to verify a candidate public key in response to receiving a message and a corresponding signature on the message created using a respective private key.

Assuming all hash values are calculated using the same one-way hash function H(key1, key2) and given a previously received root hash value PK 351 and a received tuple Sig$_{SK_0}$(m$_0$), m$_0$, A$_0$={PK$_1$,P$_1$,P$_5$}, where:
m$_0$ is a message,
Sig$_{SK_0}$(m$_0$) is the OTS signature on the message m$_0$ 304 signed using a private key SK$_0$ 320,
A$_0$={PK$_1$,P$_1$,P$_5$} is the authentication path comprising hash values PK$_1$,P$_1$,P$_5$,
verifying a candidate public key PK'$_0$ comprises performing the following:
1. Receiving Sig$_{SK_0}$(m$_0$), m$_0$,A$_0$={PK$_1$,P$_1$,P$_5$},
2. Calculating a candidate public key PK'$_0$ 336 using the signature Sig$_{SK_0}$(m$_0$) and the message m$_0$ 304;
3. Calculating hash value P'$_0$=H(PK'$_0$, PK$_1$) 352, 352',
4. Calculating hash value P'$_4$=H(P'$_0$, P$_1$) 354, 354',
5. Calculating hash value PK'=H(P'$_4$, P$_5$) 356, 356'
6. Verifying the candidate public key PK'$_0$ 336 as valid if PK'=PK.

Once the candidate public key PK'$_0$ 336 has been verified, a data structure 358 can be populated with a set of hash values that are known to be verified or authentic. The set of hash values can comprise one or more than one hash value selected from the set {PK'$_0$, PK$_1$, P'$_0$, P$_1$, P'$_4$, P$_5$}. Examples can be realised in which each verified hash value of the set of hash values is stored in the data structure 358. However, examples are not limited to such an arrangement. Examples can be realised in which a subset of verified hash values is stored in the data structure 358. For example, a constrained resource device might not have memory to store a large data structure comprising all verified hash values. In such a constrained resource device a selected subset of hash values of the verified hash values can be stored. Such a subset might contain a single verified hash value.

Populating the data structure 358 with all verified hash values following verifying candidate public key PK'$_0$ 336 gives the set {P'$_0$, P$_1$, P'$_4$, P$_5$} of verified hash values 360 excluding leaf nodes. It can be appreciated that only two hash values P$_2$ 368 and P$_3$ 370 are missing from the data structure 358 of verified data. The data structure 358 will be populated with a verified hash value P$_2$ 368 when the verifier 104 receives the message m$_4$ 312 and the associated signature Sig$_{SK_1}$(m$_4$) from which a candidate public key PK$_4$ 344 can be calculated for verification and will also be populated with a verified hash value $P_3$ 370 since that hash value will have been provided as part of the authentication path for message $m_4$ 312.

The data in the data structure 358 can be used to reduce the computational resources used to verify a subsequent candidate public key.

Assuming, again, all hash values are calculated using the same one-way hash function H(key1, key2) and given the previously received root hash value PK 351 and a received tuple $Sig_{SK_1}(m_1)$, $m_1$, $A_1=\{PK_0, P_1, P_5\}$, where:

$m_1$ is a message 306, $Sig_{SK_1}(m_1)$ is the signature of the message $m_1$ 306 signed using a private key $SK_1$ 322, $A_1=\{PK_0, P_1, P_5\}$ is the authentication path comprising hash values $PK_0$, $P_1$, $P_5$, verifying a candidate public key $PK'_1$ 338 comprises performing the following:
1. Receiving $Sig_{SK_1}(m_1)$, $m_1$, $A_1=\{PK_0, P_1, P_5\}$,
2. Calculating a candidate public key $PK'_1$ 338 using the signature $Sig_{SK_1}(m_1)$ and the message $m_1$ 306;
3. Calculating hash value $P'_0=H(PK_0,PK'_1)$ 352, 352',
4. Accessing the data structure 358 to determine whether or not there is an entry 360 corresponding to the calculated hash value $P'_0$ 252 and determining that the calculated hash value $P'_0$ 352 has been previously verified as valid;
5. If $P'_0$ 352 has been previously verified as valid, concluding that the candidate public key $PK'_1$ 338 has been verified as valid.

It will be appreciated that the foregoing avoids or otherwise saves having to repeat all computations and processing associated with:

Calculating hash value $P'_4=H(P'_0, P_1)$ 354, 354',

Calculating hash value $PK'=H(P'_4, P_5)$ 356, 356', and

Verifying the candidate public key $PK'_0$ 336 as valid if $PK'=PK$.

Therefore, the bottom-up traversal of the tree structure 302 can be terminated, insofar as concerns the current message $m_1$ when a previously verified as valid hash value has been encountered.

Figure 4:
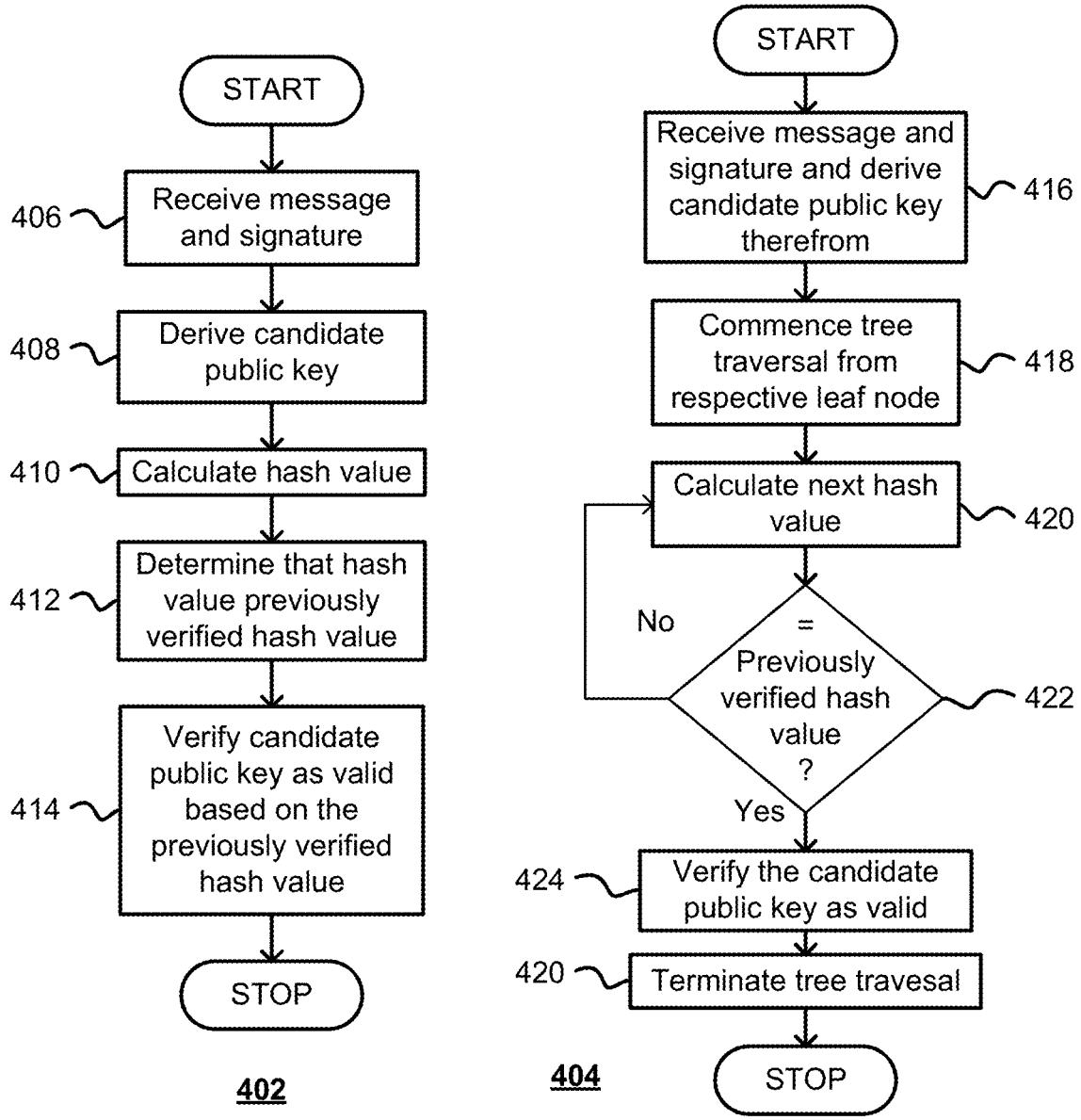
FIG. 4 illustrates a pair of flowcharts for verifying a candidate public key according to examples.

Referring to FIG. 4, there is shown a pair of flow charts 402 and 404 for verifying a candidate public key as valid according to examples.

Referring to the left-hand flowchart 402, at 406, a message and corresponding signature are received. A candidate public key is derived from the received message and corresponding signature at 408. At 410, a hash value is calculated that is related to the candidate public key. A determination is made, at 412, of whether or not the calculated hash value is, or corresponds to, a previously verified hash value. The candidate public key is verified as valid based on the previously verified hash value at 414.

Referring to the right-hand flowchart 404, at 416, a message and corresponding signature are received and a candidate public key is derived from the received message and corresponding signature. At 418, traversal of the tree is commenced in a bottom-up manner. At 420, a next hash value is calculated that is related to the candidate public key. A determination is made, at 422, of whether or not the calculated hash value is, or corresponds to, a previously verified hash value. If the calculated hash value is not, or does not correspond to, a previously verified hash value, processing returns to 420, where the next hash value is calculated. However, if the calculated hash value is, or corresponds to, a previously calculated hash value, the candidate public key is verified as value at 424 and the bottom-up traversal of the tree is terminated insofar as concerns the currently received message.

The functionality of the system 100, the signer 102 and the verifier 104 can be realised in the form of machine instructions that can be processed by a machine comprising or having access to the instructions. The machine can comprise a computer, processor, processor core, DSP, a special purpose processor implementing the instructions such as, for example, an FPGA or an ASIC, circuitry or other logic, compiler, translator, interpreter or any other instruction processor. Processing the instructions can comprise interpreting, executing, converting, translating or otherwise giving effect to the instructions. The instructions can be stored on a machine readable medium, which is an example of machine-readable storage. The machine-readable medium can store the instructions in a non-volatile, non-transient or non-transitory, manner or in a volatile, transient, manner, where the term 'non-transitory' does not encompass transitory propagating signals. The instructions can be arranged to give effect to any and all operations described herein taken jointly and severally in any and all permutations. The instructions can be arranged to give effect to any and all of the operations, devices, HSMs, dealers, systems, authenticators, flowcharts, protocols or methods described herein taken jointly and severally in any and all permutations. In particular, the machine instructions can give effect to, or otherwise implement, the operations of the flowcharts depicted in, or described with reference to, FIGS. 4, 5 and 6, taken jointly and severally in any and all permutations.

Figure 5:
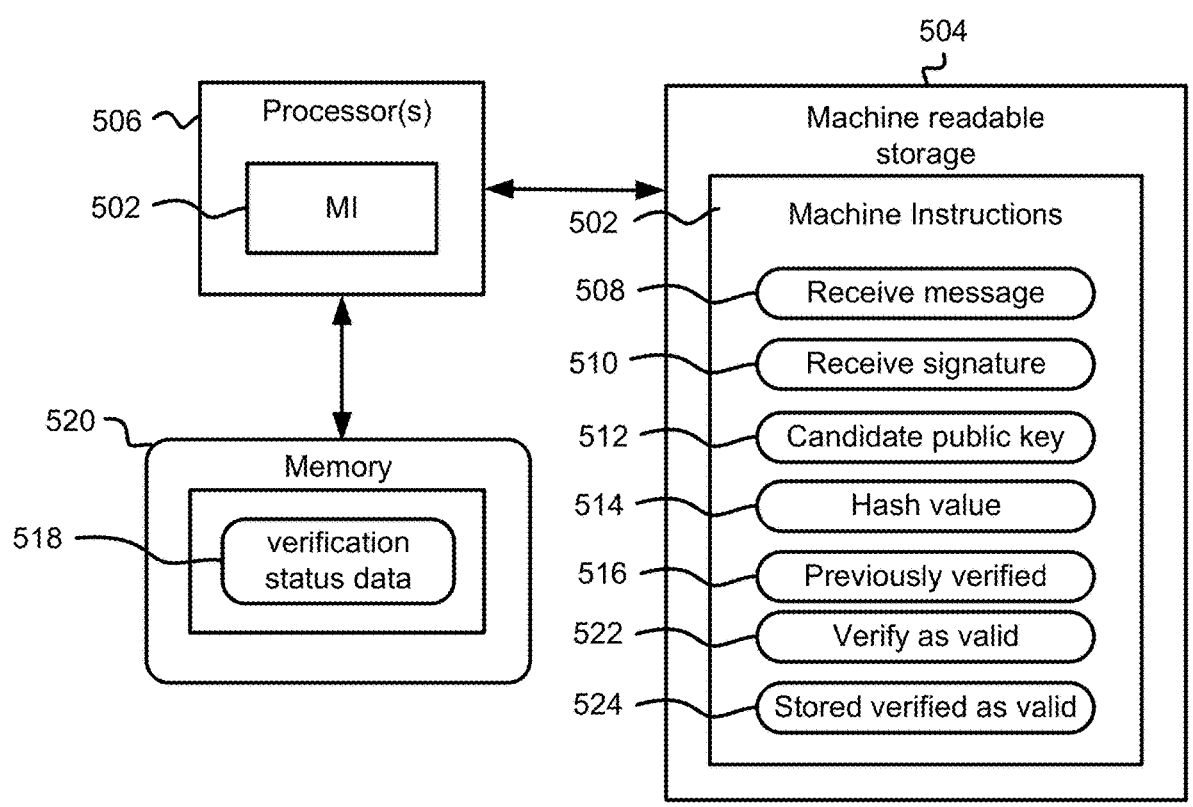
FIG. 5 illustrates machine readable storage storing machine readable instructions to verify a candidate public key according to an example.

Therefore, FIG. 5 shows a view 500 of machine instructions 502 stored using machine readable storage 504 for implementing the examples described herein. The machine instructions 502 can be processed by, for example, a processor 506 or other processing entity, such as, for example, an interpreter, as indicated above.

The machine instructions 502 comprise at least one or more than one of:

Instructions 508 to receive a message,

Instructions 510 to receive a signature associated with the message,

Instructions 512 to generate a candidate public key from the received message and received signature, Instructions 514 to calculate a hash value given respective input parameters, Instructions 516 to determine from a data structure 518 stored in memory 520 whether or not a calculated hash value has been previously verified as valid, and Instructions 522 to verify as valid a calculated hash value in response to determining that the calculated hash value has been previously verified as valid;

Instructions 524 to store a hash value that has been verified as valid;

the foregoing instructions 508 to 524 being taken jointly and severally in any and all permutations.

The above examples contrast with existing digital hash-based signature schemes in which all hash values leading from a leaf node to an overall root node are calculated to establish that a received signature is valid and, therefore, that a corresponding message is authentic. Terminating the bottom-up traversal of the tree structure when a previously verified valid hash value is encountered saves a significant number of calculations used to verify a received signature as valid and, therefore, to authenticate a corresponding message as authentic. The computational saving increases as the number of levels of a tree increased and as the number of sub-trees increases.

It will be appreciated that a the Merkle tree comprises: $2^h$ one-time key pairs $(sk_j, pk_j)$, where $0 \le j < 2^h$, and the previously stored previously verified hash value associated with the previously received message comprises: one or more than one of a plurality of hash values $q_1, \ldots, q_{2^{h+1}-1}$ where $q_i = H(q_{2i} \| q_{2i+1})$ for $1 \le i < 2^h$, $q_{2^h+j} = H(pk^{(j)})$ for $0 \le j < 2^h$ and the overall public key is $Y = q_1$.

Although the examples herein have been described using a one-way hash function H(key1,key2), examples are not limited to such a one-way hash function. Examples can be realised in which other one-way hash functions can be used. For examples, any and all examples can use one-way hash functions that take more than two parameters. Examples can be realised in which the one-way hash functions take a plurality of parameters. For instance, examples can be realised in which the one-way hash functions also have a third parameter. The third parameter can be a seed such as, for example, a randomness seed that would give a one-way hash function of H(key1,key2,randomness).

Therefore, the examples described herein facilitate authentication. Authentication is the assurance that a given entity was the original source of received data. The received data can comprise at least one, or both, of: a message and a signature derived from the message. The authentication uses a digital signature scheme. A digital signature scheme can provide authentication and comprises three algorithms, which are key generation, signature generation and verification, that is (KeyGen, Sign, Verify). The verification algorithm is run by a verifier such as any of the verifiers described herein, and takes as input any public parameters and the tuple (public_key, message, signature) and outputs either 'valid' or 'invalid'. If the verification algorithm outputs 'valid', then the verifier has assurance that a given entity was the original source of the received data (message and signature), that is, to authenticate a message, the verifier must verify the signature and receive a 'valid' output; a valid signature provides authentication to the verifier.

One or more of the examples provided herein support methods of verifying a message as authentic; the message having an associated composite signature comprising a number of signatures associated with Merkle subtrees of an overall Merkel tree; the methods comprising verifying, in turn, a subset signatures of the number of signature until a hash value associated with a signature is encountered that has been previously verified as valid, and determining that the composite signature is valid in response to encountering the hash value associated with the signature that has been previously verified as valid. Examples can be realised in which the subset of signatures comprises fewer signatures that the number of signatures of the composite signature. Examples can be realised in which the hash value previously verified as valid is associated a root node of at least one Merkle subtree of the Merkle subtrees.

Examples can be realised according to the following clauses:

Clause 1: A method of verifying as valid a received signature, associated with a received message, generated using a Merkle Signature Scheme comprising a Merkle Tree, the Merkel Tree comprising a root node, a number of leaf nodes and a number of intermediate nodes disposed between the root node and the leaf nodes; the method comprising: calculating a hash value in response to receiving the message; determining that the calculated hash value corresponds to a stored previously verified hash value calculated in response to a previously received message, and verifying the received signature as valid based on the stored previously verified hash value.

Clause 2: The method of clause 1, in which calculating a hash value in response to receiving the message comprises: calculating a hash value related to the root node.

Clause 3: The method of any preceding clause, in which calculating a hash value in response to receiving the message comprises: calculating a hash value associated with an authentication path related to the received message.

Clause 4: The method of any preceding clause, in which the Merkle Tree a multi-tree Merkle Tree comprising a number of subtrees, each subtree comprising a respective subtree root node, a respective number of leaf nodes and a number of intermediate nodes disposed between the respective subtree root node and respective leaf node, and in which the root node is associated with one of the sub-trees.

Clause 5: The method of clause 4, in which calculating a hash value in response to receiving the message comprises: calculating the hash value associated with a respective root node of a subtree of the number of subtrees.

Clause 6: The method of any preceding clause, in which: the Merkle tree comprises: $2^h$ one-time key pairs $(sk_j, pk_j)$, where $0 \le j < 2^h$, and the previously stored previously verified hash value associated with the previously received message comprises: one or more than one of a plurality of hash values $q_1, \ldots, q_{2^{h+1}-1}$ where $q_i = H(q_{2i} \| q_{2i+1})$ for $1 \le i < 2^h$, $q_{2^h+j} = H(pk^{(j)})$ for $0 \le j < 2^h$ and the overall public key is $Y = q_1$.

Clause 7: The method of any preceding clause, comprising calculating, verifying and storing the verified hash value calculated in response to the previously stored message.

Clause 8: The method of any preceding clause, comprising: terminating traversing of the Merkle Tree at a node, such as, for example, a root node, of a subtree corresponding to the calculated hash value that corresponds to the stored previously verified hash value in response to said verifying the received signature as valid based on the stored previously verified hash value associated with the previously received message.

Clause 9: The method of any preceding clause, comprising: traversing the Merkle Tree from a leaf node associated with the received message having a respective authentication path comprising at least respective intermediate nodes; said traversing comprising said: calculating a hash value in response to receiving the message; determining that the calculated hash value corresponds to a stored previously verified hash value calculated in response to a previously received message, and verifying the received signature as valid based on the stored previously verified hash value calculated in response to the previously received message, and terminating said traversing of the Merkle Tree in response to said verifying the received signature as valid based on the stored previously verified hash value calculated in response to the previously received message; said terminating being at a root node of a subtree corresponding to the calculated hash value corresponding to the stored previously verified hash value.

Clause 10: The method of any preceding clause, comprising: traversing the Merkle Tree from a leaf node associated with the received message having a respective authentication path comprising at least respective intermediate nodes; said traversing comprising said: calculating a hash value in response to receiving the respective message; determining that the calculated hash value corresponds to a stored previously verified hash value calculated in response to a previously received message, and verifying the received signature as valid based on the stored previously verified hash value, and terminating said traversing of the Merkle Tree in response to said verifying the received signature as valid based on the stored previously verified hash value associated with the previously received message; said terminating being at an intermediate node corresponding to the calculated hash value corresponding to the stored previously verified hash value.

Clause 11: A method of authenticating a block of data of a plurality of blocks of data; the method comprising: receiving the block of data and a respective signature; verifying the received signature as valid based on a previously verified hash value calculated in response to a previously received message of any preceding clause; designating the received block of data as authentic in response to said verifying the received signature as valid.

Clause 12: The method of clause 11, in which the plurality of blocks of data represent software.

Clause 13: A device for verifying code as authentic, the code having an associated received signature generated using a hash based signature scheme comprising a tree structure, the tree structure comprising a root node, a number of leaf nodes and a number of intermediate nodes disposed between the root node and the leaf nodes; the device comprising logic to comprising: receive a portion of data associated with the code and the signature; the portion of data associated with the code being one of a number of portions of data associated with the whole of the code; calculate a hash value in response to receiving the portion of data associated with the code; determine that the calculated hash value corresponds to a stored previously verified hash value calculated in response to receiving a previously received portion of data associated with the code, and verify the received portion of data as valid based on the previously verified hash value calculated in response to receiving the previously received portion of data associated with the code.

Clause 14: The device of clause 13, comprising logic to verify the whole of the code as authentic in response to verifying as authentic each portion of data of the number of portions of data.

Clause 15: A method of verifying as valid a current composite signature associated with a currently received message; the current composite signature comprising a number of signatures; the method comprising: verifying as valid a previously received composite signature, comprising a number of previously received signatures, associated with a previously received message including verifying as valid the number of previously received signatures; verifying as valid the current composite signature by verifying as valid a signature of the number of signatures of the current composite signature; and establishing that a further signature of the number of signatures of the current composite signature is common to a previously received signature verified as valid of the number of previously received signatures.

Clause 16: A method of verifying as valid a signature, associated with a message, generated using a Hash Based Signature Scheme having an associated Multi-Tree structure comprising an overall root node, having a respective public key, and two or more levels of sub-trees; the method comprising: verifying as valid a OTS associated with the respective message; establishing that the OTS is derived from a private key of a sub-tree having a previously verified root node hash value; determining, in response to said establishing, that the signature associated with the respective message is valid.

Clause 17: Machine-instructions arranged, when processed, for implementing any method of any of clauses 1 to 12, and clauses 15 to 16.

Clause 18: Machine-readable storage storing machine-instructions of clause 17.

The invention claimed is:

1. A non-transitory machine-readable storage storing machine-instructions arranged, when processed by a processor, to
verify as valid a signature generated using a Merkle Signature Scheme comprising a Merkle Tree, the Merkle Tree comprising:
a root node;
a number of leaf nodes; and
a plurality of intermediate nodes disposed between the root node and the leaf nodes;
wherein verifying the signature as valid includes:
receiving the signature and a message associated with the signature;
deriving a candidate public key from the signature and the message;
calculating a hash value in response to receiving the message;
calculating a first hash value using the candidate public key;
determining that the first hash value corresponds to a stored previously verified second hash value, wherein the stored previously verified second hash value was calculated in response to a previously received message; and
verifying the candidate public key as valid based on the stored previously verified second hash value, wherein verifying the candidate public key verifies the signature.

2. The non-transitory machine-readable storage of claim 1, comprising further instructions that, when executed by the processor, cause the processor to calculate a hash value related to the root node in response to receiving the message.

3. The non-transitory machine-readable storage of claim 1, comprising further instructions that, when executed by the processor, cause the processor to, in response to receiving the message, calculate a hash value associated with an authentication path related to the message.

4. The non-transitory machine-readable storage of claim 1, wherein the Merkle Tree is a multi-tree Merkle Tree comprising a number of subtrees, and wherein each subtree comprises an independent subtree root node, and wherein the number of leaf nodes and a number of intermediate nodes are disposed between the subtree root node and leaf nodes, and further wherein the root node is associated with one of the subtrees.

5. The non-transitory machine-readable storage of claim 4, comprising further instructions that, when executed by the processor, cause the processor to, in response to receiving the message, calculate the hash value associated with a respective root node of a subtree of the number of subtrees.

6. The non-transitory machine-readable storage of claim 1, wherein the Merkle tree comprises:
$2^h$ one-time key pairs $(sk_j, pk_j)$, where $0 \leq j < 2^h$, and
wherein the previously stored previously verified second hash value associated with the previously received message comprises:
one or more than one of a plurality of hash values $q_1, \ldots, q_{2^{h+1}-1}$ where $q_i = H(q_{2i} \| q_{2i+1})$ for $1 \leq i < 2^h$, $q_{2^h+j} = H(pk^{(j)})$ for $0 \leq j < 2^h$ and an overall public key is $Y = q_1$.

7. The non-transitory machine-readable storage of claim 1, comprising further instructions that, when executed by the processor, cause the processor to calculate, verify and store the second hash value calculated in response to the previously received message.

8. The non-transitory machine-readable storage of claim 1, comprising further instructions that, when executed by the processor, cause the processor to terminate traversing of the Merkle Tree at a node of a subtree corresponding to the first hash value that corresponds to the stored previously verified second hash value in response to verifying the received signature as valid based on the stored previously verified second hash value associated with the previously received message.

9. The non-transitory machine-readable storage of claim 1, comprising further instructions that, when executed by the processor, cause the processor to:
traverse the Merkle Tree from a leaf node associated with the message having a respective authentication path comprising at least respective intermediate nodes, wherein traversing the Merkle Tree includes:
calculating a hash value in response to receiving the message;
determining that the first hash value corresponds to a stored previously verified second hash value calculated in response to the previously received message; and
verify the received signature as valid based on the stored previously verified second hash value calculated in response to the previously received message and
terminate the traversing of the Merkle Tree in response to the verification of the received signature as valid based on the stored previously verified second hash value calculated in response to the previously received message, wherein terminating at a root node of a subtree corresponds to the first hash value corresponding to the stored previously verified second hash value.

10. The non-transitory machine-readable storage of claim 1, comprising further instructions that, when executed by the processor, cause the processor to:
traverse the Merkle Tree from a leaf node associated with the message having a respective authentication path comprising at least respective intermediate nodes, wherein traversing the Merkle Tree includes:
calculating a hash value in response to receiving the message;
determining that the first hash value corresponds to a stored previously verified second hash value calculated in response to the previously received message; and
verifying the received signature as valid based on the stored previously verified second hash value; and
terminating traversing of the Merkle Tree in response to verifying the received signature as valid based on the stored previously verified second hash value associated with the previously received message, wherein terminating being at an intermediate node corresponding to the first hash value corresponding to the stored previously verified second hash value.

11. A computing device comprising:
a non-transitory memory storing instructions for verifying code as authentic, wherein the code comprises an associated received signature generated using a hash based signature scheme comprising a tree structure, and wherein the tree structure comprises:
a root node;
a number of leaf nodes; and
a number of intermediate nodes disposed between the root node and the leaf nodes; and
a processor in communication with the non-transitory memory, wherein the processor is to:
receive a portion of data associated with the code and the signature, wherein the portion of data associated with the code is one of a number of portions of data associated with the code;
derive a candidate public key from the signature and the portion of data associated with the code;
calculate a first hash value in response to receiving the portion of data associated with the code;
determine that the first hash value corresponds to a stored previously verified second hash value calculated in response to receiving a previously received portion of data associated with the code; and
verify the candidate public key as valid based on the previously verified second hash value calculated in response to receiving the previously received portion of data associated with the code, wherein verifying the candidate public key verifies the signature.

12. The computing device of claim 11, wherein the processor is further to verify the code as authentic in response to verifying as authentic each portion of data of the number of portions of data.

13. A non-transitory computer-readable medium comprising instructions that, when executed by a processor, cause the processor to:
verify as valid a current composite signature associated with a currently received message, wherein the current composite signature comprises a number of signatures;
verify as valid a previously received composite signature, comprising a number of previously received signatures, associated with a previously received message including verifying as valid the number of previously received signatures;
verify as valid a signature of the number of signatures of the current composite signature; and
establish that a further signature of the number of signatures of the current composite signature is common to a previously received signature that was previously verified as valid, the previously received signature being one of the number of previously received signatures.

14. The non-transitory computer-readable medium of claim 13, comprising further instructions that, when executed by the processor, cause the processor to:
verify as valid a previously received composite signature, comprising a number of previously received signatures, associated with the previously received message including instructions to verify as valid the number of previously received signatures; and verify as valid a previously received signature associated with a root node of a subtree of a Merkle tree used to verify as valid the current composite signature.

15. The non-transitory computer-readable medium of claim 13, comprising further instructions that, when executed by the processor, cause the processor to store in a data structure a previously received signature that was verified as valid.

\* \* \* \* \*